US005354598A

United States Patent [19]

Arens

[11] Patent Number: 5,354,598

[45] Date of Patent: Oct. 11, 1994

[54] ARTICLE CAPABLE OF DISPLAYING DEFINED IMAGES

[75] Inventor: Robert P. Arens, St. Paul, Minn.

[73] Assignee: Minnesota Mining and Manufacturing Company, St. Paul, Minn.

[21] Appl. No.: 867,139

[22] Filed: Apr. 10, 1992

[51] Int. Cl.$^5$ .................................................. B32B 9/00

[52] U.S. Cl. .................................... 428/195; 428/206; 428/304.4; 428/312.6; 428/315.5; 428/321.1

[58] Field of Search .................. 428/304.7, 321.1, 195, 428/206, 315.5, 312.6; 156/659.1, 156, 660

[56] References Cited

U.S. PATENT DOCUMENTS

| | | | |
|---|---|---|---|
| 543,889 | 8/1895 | Paini | 156/660 |
| 777,278 | 12/1904 | Davidson . | |
| 1,182,623 | 5/1916 | Bardsley | 156/659.1 |
| 2,803,615 | 8/1957 | Ahlbrecht et al. | 260/29.6 |
| 2,803,656 | 8/1957 | Ahlbrecht et al. | 260/556 |
| 2,854,350 | 9/1958 | Phillpotts | 117/36 |
| 2,934,450 | 4/1960 | Brown | 106/287 |
| 3,094,547 | 6/1963 | Heine | 260/461 |
| 3,508,344 | 4/1970 | Thomas | 35/9 |
| 3,574,791 | 4/1971 | Sherman et al. | 260/884 |
| 3,905,117 | 9/1975 | Walton | 33/174 B |
| 3,916,053 | 10/1975 | Sherman et al. | 428/96 |
| 3,950,298 | 4/1976 | McCown et al. | 260/33.6 |
| 4,023,524 | 5/1977 | Goldfarb et al. | 118/301 |
| 4,299,880 | 11/1981 | Arens | 428/304 |
| 4,374,889 | 2/1983 | Arens | 428/207 |
| 4,418,098 | 11/1983 | Maistrovich | 427/161 |
| 4,877,253 | 10/1989 | Arens | 273/240 |

OTHER PUBLICATIONS

Encyclopedia of Polymer Science & Technology, Interscience, N.Y. 1965, vol. 3, p. 833 et seq.

Encyclopedia of Chemical Technology Interscience, N.Y. 1971, Suppl. vol., p. 889, et seq.

*Primary Examiner*—Patrick J. Ryan
*Assistant Examiner*—W. Krynsky
*Attorney, Agent, or Firm*—Gary L. Griswold; Walter N. Kirn; James V. Lilly

[57] ABSTRACT

An article capable of being marked by application of a colored or non-colored fluid thus creating a visible image thereon, said article comprising a substrate bearing a patterned or discontinuous barrier to said fluid.

19 Claims, No Drawings

ARTICLE CAPABLE OF DISPLAYING DEFINED IMAGES

FIELD OF THE INVENTION

This invention relates to articles that can be treated, such as through printing or transparentizing, to display images.

BACKGROUND OF THE INVENTION

Many techniques are employed to generate imaged information on surfaces. For example, pens, ink jet printers, lithographic printers, flexographic printers, and the like have been used to apply information to a substrate. One problem that has been encountered with these techniques is the tendency of the marking fluids, such as inks or other liquids which are used to "wick" or spread out on or in the substrate. The resultant images then are neither well defined nor aesthetically pleasing.

Attempts to overcome the problem of wicking or spreading have included the bulk application of materials which retard or prevent these phenomena. However, such bulk application suffers the disadvantage that it hinders penetration of the marking fluid into the printed surface. This in turn hinders drying of the ink and increases the chance that offsetting will occur when the marked sheets are stacked on one another. When a transparentizing fluid is employed, such bulk application blocks penetration of the marking fluid into the surface and prevents making the mark visible.

Examples of the use of transparentizing fluids are discussed in a number of patents. For example, U.S. Pat. No. 4,877,253, (Arens) discloses a sheet material which can be temporarily transparentized (thereby marked) by the use of a colorless volatile liquid. A liquid impervious support can be used to prevent the volatile liquid from leaking out of the back of the sheets.

U.S. Pat. No. 4,418,098, (Maistrovich) discloses a microvoid sheet which can be transparentized by applying a colorless liquid which is a non-solvent for the microvoid network. The colorless liquid is jellified by a slightly soluble polymeric material which is applied to the entire sheet and occupies about 5% of the void volume.

U.S. Pat. No. 4,374,889, (Arens) discloses a microvoid sheet which is transparentized by application of liquids having surface tensions lower than about 30 dynes. This is accomplished by treating the entire area of one side of the sheet with oleophobic and hydrophobic substances. The other side of the sheet is left untreated.

There still exists a need for an article which can accept a marking fluid and provide a well defined image thereon.

BRIEF DESCRIPTION

The present invention provides an article that can be marked with a fluid and provide a well defined image thereon. Additionally the present invention confines the marking fluid to a predetermined area and prevents it from wicking or spreading out beyond that area with time. The ultimate effect is the provision of a sharply defined image.

The present invention comprises an article capable of being marked by application of a fluid, the article having incorporated therewith a barrier to the fluid. This barrier is applied to the article in a patterned or discontinuous manner.

The article can be marked by either a colored or a non-colored fluid. Additionally, the substrate to which the barrier is applied can be either a non-voided or a microvoided substrate.

In another embodiment of the invention, the article comprises a sheet material which preferably can be locally transparentized by application of a transparentizing liquid.

DETAILED DESCRIPTION

The present invention provides a substrate which has been treated in a patterned (i.e., discontinuous) manner with a barrier material which preferably is essentially imperceptible with normal viewing or to the touch. In this way the marking fluid is limited to the predetermined area or areas.

A variety of substrates can be utilized in the invention. As discussed above, they may have a non-voided or microvoided structure. Examples of materials that can be used as the non-voided structure include polymeric films (e.g. polyethylene, polypropylene, polyester, polyimide, etc.), metals, glass and the like. Examples of materials useful as the microvoided structure include paper, and non-woven webs of polymeric fibers such as polypropylene, polyethylene, polyurethane, etc. Blushed lacquer coatings, such as disclosed in U.S. Pat. No. 3,508,344 and the microporous layer of U.S. Pat. No. 2,854,350 may also be used as the microvoid material.

U.S. Pat. No. 4,299,880 describes another type of microvoid material which is useful in the invention. This material comprises a sheet which has been coated on at least one surface with an opaque microporous layer comprising particles having a refractive index of from about 1.3 to 2.2. The particles are incorporated into a binder which has a refractive index in the same range as that of the particles. This disclosure of U.S. Pat. No. 4,299,880 relating to the microvoid material is incorporated herein by reference.

The barrier useful in the invention can be applied either to the surface of the substrate or throughout the substrate provided, of course, that it is present in a patterned manner. When a microvoid substrate is employed it is preferred that, where present, the barrier be distributed throughout the thickness of the microvoid material.

The barrier material employed in the invention either repels the marking fluid or causes it to jell. In either event it prevents the migration of the marking fluid into unwanted areas. The barrier may be applied so as to provide either a positive or a negative image.

Examples of useful barrier materials include oleophobic fluorochemical materials such as chromium complexes of $R_fSO_2N(R')RCOOH$, wherein $R_f$ is a perfluoroalkyl group containing 4–20 carbon atoms, R is an alkylene bridging group containing 1–12 carbon atoms, and R' is H or an alkyl group containing 1–6 carbon atoms; U.S. Pat. No. 2,934,450 discloses such fluorochemicals. Another suitable class of oleophobic fluorochemicals is defined by the structural formula $[R_fSO_2N(R)R'O]_mPO(OX)_{3-m}$, wherein $R_f$ is as just defined, R is H or an alkyl group having 1–12 carbon atoms, R' is an alkylene bridging group having 2–12 carbon atoms, X is H, $NH_4$, Na or $NH_2(C_2H_4OH)_2$, and m is 1 or 2; U.S. Pat. No. 3,094,547 discloses such fluorochemicals. Fluorochemicals are, of course, well known and have been employed as surface treatments for imparting oleophobic or oleophobichydrophobic properties to fibrous sheet material; see, e.g., U.S. Pat. Nos. 2,803,615, 2,934,450, 3,950,298, 3,574,791, 3,916,053, and 2,803,656.

Specific examples of such fluorochemicals include

1. $[C_8F_{17}SO_2N(CH_3)C_2H_4OCH_2CH(CH_2Cl)O_2CCH_2CH_2]_2$
2. $[C_8F_{17}SO_2N(C_2H_5)C_2H_4O]_2POONH_4$
3. $[CSF_{17}SO_2N(C_2H_5)C_2H_4]_2POOH$
4. $[CSF_{17}SO_2N(C_2H_5)C_2H_4O]_2POONa$
5. $[C_8F_{17}SO_2N(C_2H_5)C_2H_4O]_2POONH_2(C_2H_4OH)_2$
6. $[C_8F_{17}SO_2N(C_2H_5)C_2H_4O]_3PO$
7. $C_8F_{17}SO_2N(C_2H_5)C_2H_4OPO(OH)_2$
8. $C_8F_{17}SO_2N(C_2H_5)C_2H_4OPO(ONH_4)_2$
9. 50:50 copolymer of $C_8F_{17}SO_2N(CH_3)C_2H_4O_2CCH{=}CH_2$ and dimethacrylate ester of poly (oxyethylene) glycol (molecular weight about 4,000)
10. 70:30 copolymer of $C_8F_{17}SO_2N(CH_3)C_2H_4O_2CCHCH_2$ and methoxy poly(oxyethylene)acrylate (molecular weight 750)
11. 95:5 $C_8F_{17}S_2N(CH_3)C_2H_4O_2CCHCH_2$: $C_4H_9O_2CHCH_2$ copolymer
12. $[C_2F_5(C_2F_4)_{3-8}C_2H_4O]_2POONH_2(C_2H_4OH)_2$
13. Terepolymer of $C_9F_{19}C_2H_4O_2CCHCH_2$, $CH_2CHCl$, and $CH_2CHCONHCH_2OH$
14. Chrome complex of $C_8F_{17}SO_2N(C_2H_5)CH_2COOH$
15. Chrome complex of $C_8F_{17}SO_2N(C_2H_5)C_2H_4OPO(OH)_2$
16. Chrome complex of $C_7F_{15}COOH$
17. 70:30 $C_8F_{17}SO_2N(CH_3)C_2H_4OH$: acrylic acid copolymer
18. $C_7H_{15}COONH_4$
19. $C_8F_{17}SO_2N(C_2H_5)CH_2COOK$
20. 70: 30 $C_8F_{17}C_2H_4OCOC(CH_3)CH_2$: $C_8H_{17}OCOCHCH_2$ copolymer Examples of hydrophobic barrier materials include the chrome complex of $C_{14}H_{29}COOH$, stearic acid, hydrocarbon waxes, RTV silicones, and fluorochemical materials such as compounds 1, 6, 7, 9, 10–14 and 20 of the above list of specific oleophobic fluorochemicals, these fluorochemical materials being both oleophobic and hydrophilic.

Yet another useful barrier material is disclosed in U.S. Pat. No. 4,418,098. This material comprises a substance, typically an organic polymer, which jells the marking fluid. A simple test for determining whether a given substance is suitable for use with a specific marking liquid involves placing 10 grams of the putative jellifying substance and 90 grams of marking liquid in a 500-cc glass jar, tightly capping the jar, and tumbling it for 24 hours. If the substance and marking liquid have formed a homogeneous gelatinous ball with no liquid remaining, the combination is deemed suitable for use in practice of the invention.

To determine whether a given jellifying substance-marking liquid combination will probably be effective in practicing the invention, it has been found useful to consider their respective solubility parameters, $\delta$(measured in hildebrands).[1] Generally speaking, if the solubility parameters of the jellifying substance and the marking liquid differ by approximately 2 hildebrands, the combination is likely to be effective in practice of the present invention; smaller differences tend to result in lower solution viscosities, and greater differences tend to result in insufficient gelling to inhibit lateral wicking.

[1]Detailed discussions of solubility parameters, their measurement and calculation are found in (1) Encyclopedia of Polymer Science and Technology, Interscience, New York (1965), Vol. 3, page 833 et seq., and (2) Encyclopedia of Chemical Technology, Interscience, New York, (1971), Supplement Vol, page 889 et seq.)

Articles of the invention can be readily prepared. For example, the substrate may be printed with the barrier material to provide patterned or discontinuous areas of the material using any of a number of application techniques. Such techniques include, by way of example, screen printing, dot matrix printing, ink jet printing, flexographic printing, gravure printing, stamping, etc. When necessary, the material may be dried using elevated temperatures, e.g. above room temperature.

Articles of the invention can be used for a number of purposes. For example, they may be used for gaming devices (e.g., bingo cards), sweepstakes tickets, counterfeit detection devices, toys (e.g., to display changes in complexion of dolls or to display other special effects), promotional literature (e.g., to display various information), educational aids, data security devices, etc.

The following examples further illustrate the present invention and are not intended to limit the invention to the specific embodiments shown therein. In these examples, all parts, ratios and percentages are by weight unless otherwise noted. In each of the examples the barrier was imperceptible with normal viewing and to the touch.

EXAMPLE 1

An existing single use bingo paper consisting of printed newsprint was flexographically pattern printed with a solution of 40% of $(C_8F_{17}SO_2N(C_2Hs)C_2H_4O)_2POONH_4$ and 60% propylene glycol in a pattern such that a $\frac{5}{8}$ inch (1.6 cm) diameter circle centered in each numbered cell was left untreated. After drying, dabbing any number cell with liquid paraffin produced a dab mark that was originally $\frac{5}{8}$ inch (1.6 cm) in diameter. After two hours, the mark was still $\frac{5}{8}$ inch (1.6 cm) in diameter. A control sample which had no barrier material printed thereon provided an initial dab diameter of $\frac{5}{8}$ inches (1.6 cm). After two hours it had spread to 1.5 inches (3.8 cm) in diameter and covered about half of all adjacent cells. In spreading, the visibility of the control mark became undesirably greatly reduced whereas the visibility of the marks on the treated sample was still vivid.

EXAMPLE 2

Following the general procedure described in Phillpotts (U.S. Pat. No. 2,854,350), a control was prepared by placing 39.6 grams of water, 0.4 gram sodium alginate and 5 grams precipitated calcium carbonate in a 4 ounce jar and ball milling for several days. The resulting composition was knife coated at a wet caliper of about 200 micrometers onto the surface of black 60 micrometer caliper black greaseproof paper and allowed to dry overnight; the dried coating was approximately 25 micrometers thick.

In accordance with the invention, a portion of the above sample was gravure pattern printed with a solution of 5% chrome complex of $C_8F_{17}SO_2N(C_2H_5)CH_2COOH$ in methanol in the same pattern used in Example 1. After drying, dabbing any numbered cell with propylene glycol gave a $\frac{5}{8}$ inch (1.6 cm) diameter dab which did not increase in diameter. Dabbing the control produced a dab having an initial diameter of ⅝ inch (1.6 cm) diameter and a diameter of 1 inch (2.5 cm) after one hour.

EXAMPLE 3

Following the general procedure described in Thomas (U.S. Pat. No. 3,508,344) a control was prepared by placing 75.1 grams acetone, 6.6 grams polymethyl methacrylate ("Elvacite" 2041 from E.I. dupont de Nemours & Company), 1.6 grams diethylphthalate, 1.1 grams polyacrylate ("Rhoplex" B-15, available from Rohm & Haas Company) and 11 grams of water in an 8 ounce jar and ball milling overnight. The resulting composition was knife coated onto a 60 micrometer caliper black greaseproof paper and allowed to dry at room temperature overnight to leave a coating about 50 micrometers thick.

In accordance with the present invention, one half of the above sample was stamp pad printed with the fluorochemical solution described in Example 1 in a pattern to form ½ inch (1.3 cm) diameter untreated circles centered on each cell of a previously conventionally printed bingo grid. After drying, all the cells were dabbed with dodecane. This produced dabs having initial diameters of ½ inch (1.3 cm). After about 1 hour the dabs had evaporated without ever spreading to be larger than ½ inch (1.3 cm) in diameter. Identical dabs produced on the control sample spread to ¾ inch (1.9 cm) in diameter within 15 minutes.

EXAMPLE 4

Following the procedures described in Arens (U.S. Pat. No. 4,877,253, Example 1 at column 4, lines 15–38), a control coating composition was prepared and coated onto blue kraft paper.

In accordance with the present invention, one half of the above sample was flexographically printed with a solution of 20% of $(C_8F_{17}SO_2N(C_2HS)C_2H_4O)_2$-$POONH_4$ and 80% propylene glycol in the same pattern used in Example 1. After drying at 200° F. (93° C.), dabbing any cell with liquid paraffin produced a non expanding ⅝ inch (1.6 cm) diameter dab. A similar dab on the control sample expanded by 1/16 inch (0.16 cm) with 5 minutes.

EXAMPLE 5

A coated sheet similar to that described for the control in Example 4 was converted into a tractor fed fan folded computer printer paper. This paper was bar code printed using a dot matrix impact printer having a nylon ribbon containing a 20% solution of $(C_8F_{17}SO_2N(C_2H_5)C_2H_4O)_2POONH$ in propylene glycol. After drying at room temperature, the printed area (no longer visible) was dabbed with volatile liquid paraffin to reveal the previously printed bar code in reverse.

EXAMPLE 6

A support sheet was prepared as described in Arens (U.S. Pat. No. 4,877,253, Column 4, lines 15–38). a solution of 99.5% toluene and 0.5% polyisobutylene was gravure printed onto one surface of the sheet to form a line (½ inch (1.3 cm) wide) the full length of the sheet. When a dab of liquid paraffin was placed adjacent to the printed line, it did not wick beyond the line within 1 hours. In a control sample with no printed barrier, the liquid paraffin wicked for a distance of 3 millimeters within 2 hours.

I claim:

1. An article capable of being marked with a fluid so as to provide an area of a localized image comprising
(a) a substrate, and
(b) a patterned treatment of a barrier material on or in said substrate;
wherein said treatment of barrier material confines said fluid to said area by preventing the migration of said fluid from said area, and wherein said barrier is selected from the group consisting of an oleophobic material, a hydrophobic material, an oleophobic-hydrophobic material and a jellifying material.

2. An article according to claim 1 wherein said barrier comprises a coating thereon.

3. An article according to claim 1 in the form of a sheet.

4. An article according to claim 1 wherein said barrier material is selected from the group consisting of an eloephobic material, a hydrophobic material, and an oleophobic-hydrophobic material.

5. An article according to claim 4 wherein said barrier material is an oleophobic fluorochemical.

6. An article according to claim 4 wherein said barrier material is an oleophobichydrophobic fluorochemical.

7. An article according to claim 1 wherein said barrier material is a hydrophobic material selected from the group consisting essentially of $C_{14}H_{29}COOH$, stearic acid, silicone materials and hydrocarbon waxes.

8. An article according to claim 1 wherein patterned treatment of said barrier material is essentially imperceptible with normal viewing.

9. An article of the type which can be locally transparentized when a transparentizing fluid is applied thereto, comprising a substrate having therein a patterned barrier to said transparentizing fluid.

10. An article according to claim 9 wherein said substrate comprises a microvoided structure.

11. An article according to claim 10 wherein said microvoided structure comprises an organic polymer.

12. An article according to claim 11 wherein said microvoided structure comprises paper.

13. An article according to claim 10 wherein said patterned barrier is present substantially throughout the thickness of said microvoided structure.

14. An article according to claim 9 wherein said barrier comprises an oleophobic material which prevents said transparentizing fluid from penetrating said substrate where said barrier is present.

15. An article according to claim 9 wherein said barrier comprises a hydrophobic material which prevents said transparentizing fluid from penetrating said substrate where said barrier is present.

16. An article according to claim 9 wherein said barrier comprises a material which causes said transparentizing fluid to jell when contacted therewith.

17. An article according to claim 9 in the form of a sheet.

18. An article capable of being locally marked by application of a liquid, said article having throughout a patterned barrier to said liquid which pattern defines at least one area for being locally marked wherein said barrier is an oleophobic fluorochemical material that confines said liquid to said area.

19. An article capable of being locally marked by application of a liquid, said article having throughout a patterned barrier to said liquid which pattern defines at least one area for being locally marked wherein said barrier is an oleophobic-hydrophobic fluorochemical material that confines said liquid to said area.

* * * * *

UNITED STATES PATENT AND TRADEMARK OFFICE

CERTIFICATE OF CORRECTION

PATENT NO.: 5,354,598

DATED: October 11, 1994

INVENTOR(S): Robert P. Arens

It is certified that error appears in the above-identified patent and that said Letters Patent is hereby corrected as shown below:

Column 3, line 11, "3. $[CSF_{17}SO_2N(C_2H_5)C_2H_4]_2$ POOH" should read
-- 3. $[C_5F_{17}SO_2N(C_2H_5)C_2H_4O]_2POOH$ --.

Column 3, line 12, "4. $[CSF_{17}SO_2N(C_2H_5)C_2H_4O]_2POONa$ should read
-- 4. $[C_5F_{17}SO_2N(C_2H_5)C_2H_4O]_2POONa$ --.

Column 5, line 38, "$(C_8F_{17}SO_2N(C_2HS)C_2H_4O)_2$-" should read
-- $(C_8F_{17}SO_2N(C_2H_5)C_2H_4O)_2$- --.

Column 6, line 18, "eloephobic" should read -- oleophobic --.

Signed and Sealed this

Seventeenth Day of December, 1996

Attest:

BRUCE LEHMAN

Attesting Officer

Commissioner of Patents and Trademarks